Feb. 26, 1952     C. E. DEARDORFF ET AL     2,587,121
HYDRAULICALLY REINFORCED SPRING SEAT SUPPORT
Filed Oct. 4, 1948
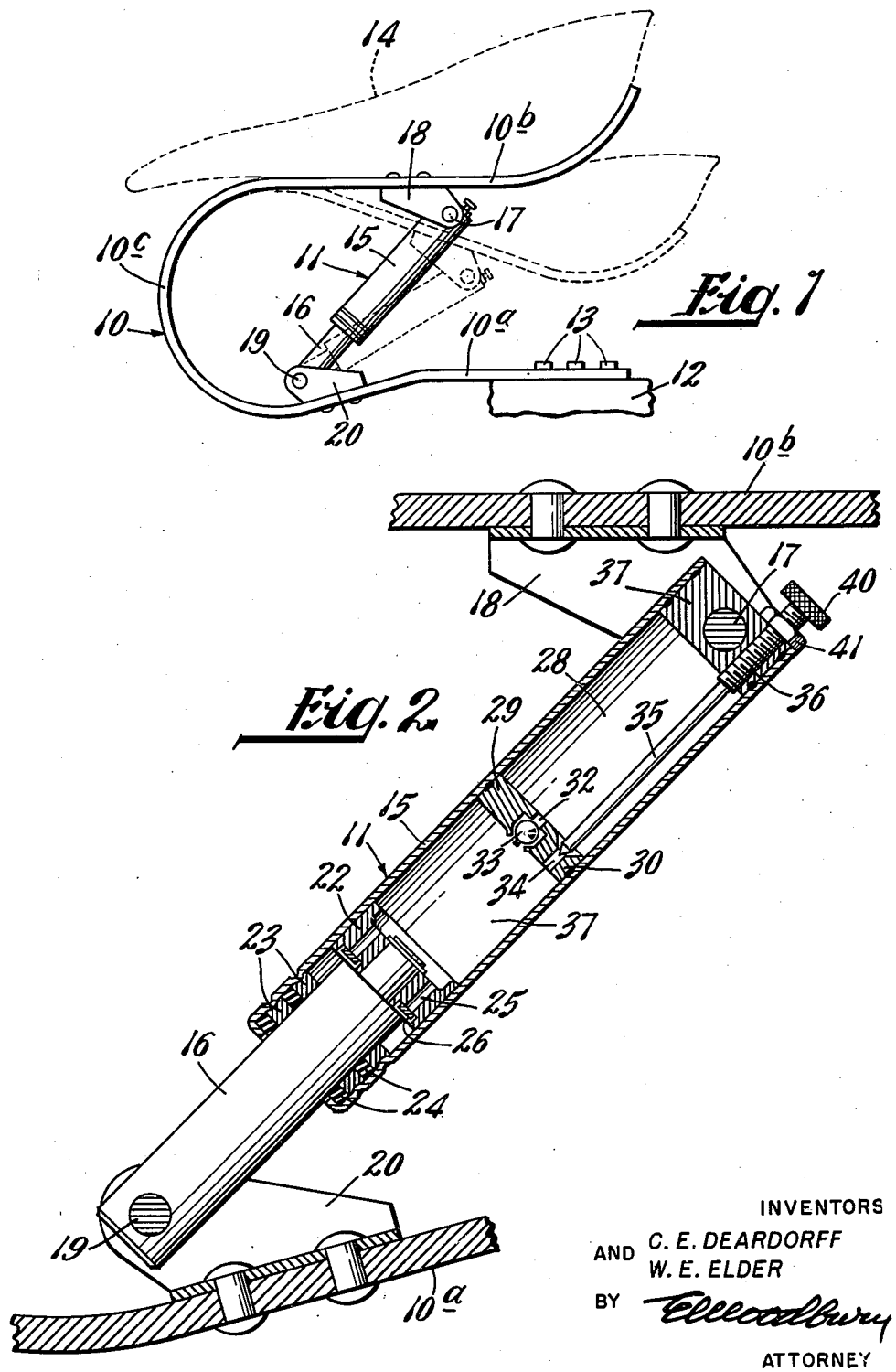
INVENTORS
C. E. DEARDORFF
AND W. E. ELDER
BY *Ellecalbury*
ATTORNEY Patented Feb. 26, 1952

2,587,121

UNITED STATES PATENT OFFICE 2,587,121

HYDRAULICALLY REINFORCED SPRING SEAT SUPPORT

Clinton E. Deardorff, San Fernando, and William E. Elder, Sherman Oaks, Calif., assignors to Bendix Aviation Corporation, South Bend, Ind., a corporation of Delaware Application October 4, 1948, Serial No. 52,706

6 Claims. (Cl. 155—51)

This invention relates to spring seats for vehicles such as farm tractors and the like and has as a broad object to provide a simple, compact, and inexpensive structure that is adjustable to accommodate either a light or heavy rider.

The conventional farm implement or tractor seat is an anatomically-shaped sheet metal affair secured to the outer end of a strip of spring steel, the inner end of which is anchored to the implement. There is no adjustability to such a seat, and if the spring strip is dimensioned to support a heavy rider it has very little spring action under a light rider. Contrariwise, if the spring is dimensioned to suit a light rider it has an excessive range of movement under a heavy rider.

In accordance with the present invention, the type of seat described is made more suitable for riders of all weights by supplementing the spring with a hydraulic resistance device, the resistance to downward movement of which can be readily varied by an adjusting valve. In this connection, we recognize that it is broadly old to employ hydraulic shock absorbers to snub the rebound action of a spring, but the present construction is such that the primary function of the hydraulic device is to stiffen the spring and aid it in resisting excessive downward movement caused by a heavy rider, rather than to merely dampen the oscillations of the seat.

A full understanding of the invention may be had from the following detailed description taken in connection with the drawing, in which:

Fig. 1 is a side elevation of a spring seat support in accordance with the invention; and Fig. 2 is an enlarged view of the hydraulic element of the seat support, shown in longitudinal section.

Referring to Fig. 1, the seat support therein depicted comprises, as its essential elements, an approximately U-shaped leaf spring element 10 and a hydraulic resistance device 11.

The leaf spring element 10 is positioned with its two arms 10a and 10b approximately horizontal and in a vertical plane so that the upper arm 10b is directly above the lower arm 10a. The two arm portions 10a and 10b are interconnected by a smoothly curved bend portion 10c. The rear end of the lower arm portion 10a is secured to a suitable portion 12 of the tractor or other device with which the seat support is to be used, as by screws 13. The usual seat 14 rests upon and may be secured to the upper arm portion 10b in any desired way.

As shown in Fig. 1, the hydraulic resistance device 11 comprises a cylinder 15 from the lower end of which a piston rod 16 extends. The cylinder 15 is pivotally connected near its upper end by a cross shaft 17 to a bifurcate bracket 18 that is shown riveted to the upper portion 10b of the spring element. The lower end of the piston rod 15 is likewise pivotally connected as by a cross shaft 19 to a bifurcate bracket 20 which is riveted to the lower spring arm 10a.

The hydraulic device 11 can be adjusted, as will be explained later, to vary the resistance to inward movement of the piston rod 16 into the cylinder 15 so as to aid the spring element 10c in resisting downward oscillation of the seat 14.

Referring now to Fig. 2, the cylinder 15 contains a piston 22 that is freely fitted within the cylinder and is secured to the inner end of the piston rod 16 for reciprocation therewith. The lower end of the cylinder 15 is provided with bushings 23 for laterally supporting the piston rod 16, and packing rings 24 for effecting a fluid-tight seal between the cylinder and the piston rod.

The piston 22 is provided with a plurality of longitudinal passages 25 therethrough, which passages are arranged in an annular row concentric with respect to the piston axis, and are adapted to be closed by a light annular valve element 26 when the piston 22 is moved downwardly. When the piston moves upwardly, the valve 26 opens to permit substantially free passage of the fluid through the passages 25.

The cylinder 15 is divided into a lower, working chamber 27, and an upper reservoir chamber 28 by a partition 29 which may be secured in the cylinder 15 by welding, as indicated at 30. The partition 29 has a passage 32 therein adapted to be closed by a ball check valve 33 to prevent flow from the chamber 27 to the chamber 28 through the passage 32, while permitting reverse flow. A second passage 34 in the partition 29 is adapted to be variably constricted by a needle valve 35 having a threaded portion 36 which is screwed into the upper end plug 37 of the cylinder 15. The outer end of the needle valve may be provided with a knurled knob 40 for adjustment, and a lock nut 41 may be provided for locking the needle valve in a desired position of adjustment.

The device functions as follows: Downward movement of the seat 14 with respect to the device 12 on which the seat is used tends to deflect the spring element 10 from the position shown in solid lines to the position shown in dotted lines in Fig. 1. This movement is in part resisted by the spring 10 itself and in part by the hydraulic resistance device. Thus referring to Fig. 2, let it be assumed that the chamber 27 and the space within the cylinder below the piston 22 are completely filled with a liquid such as oil, and that the reservoir chamber 28 is only partially filled with oil. Upward movement of the piston 22 opens the valve 26 to permit free passage of oil downwardly through the passages 25. However, the piston rod 16 is of substantial diameter, so that it displaces liquid as it moves into the cylinder, and the liquid in the chamber 27 is compressed and tends to escape into the reservoir 28. It can escape only past the needle valve 35, because the ball check 33 closes the passage 32. By suitably adjustably adjusting the needle valve 35, a desired control can be had on the downward movement of the seat 14 in response to any given acceleration determined by the weight of the rider and the roughness of the ground over which the vehicle is traveling. Obviously, the needle valve 35 is adjusted to close the passage 34 to a greater extent when the rider is heavy than when he is light. Likewise a tighter adjustment of the needle valve is desirable on rough ground than on smooth ground. With a very light rider it may be desirable to open up the needle valve wide so that substantially no resistance to upward movement of the piston 22 is produced.

When the seat 14 moves upwardly with respect to the support 12, either as a result of reaction of the spring 10 or by downward movement of the anchor point 12 of the vehicle, the piston 22 tends to move downwardly in the cylinder 27. Such movement is preferably impeded to a certain extent, and it is for this reason that the valved passages 25 are provided. Thus the valve 26 closes these passages in response to downward movement of the piston so that the fluid trapped around the piston rod 16 below the piston 22 can escape only through the clearance between the peripheral surface of the piston and the cylinder wall. This clearance is so chosen at the time of manufacture as to give an average resistance suitable for all usage. Of course during downward movement of the piston 22 fluid flows freely from the reservoir 28 into the chamber 27 through the passage 32, since the ball check 33 is then in open position.

Although for the purpose of explaining the invention, a particular embodiment thereof has been shown and described, obvious modifications will occur to a person skilled in the art, and we do not desire to be limited to the exact details shown and described.

We claim:

1. A resilient seat support comprising: an elongated approximately U-shaped leaf spring element the arms of which extend approximately horizontally one above the other, the lower arm being adapted to be anchored adjacent its end to the device on which the seat is to be used, and the upper arm being adapted to have a seat secured thereto adjacent its end; a hydraulic cylinder containing a piston having a piston rod extending from one end of the cylinder, said cylinder containing fluid, and fluid-flow restricting means for impeding movement of said piston rod into said cylinder to a greater extent than out of said cylinder; and means for pivotally connecting the cylinder to one arm of said spring element and pivotally connecting the piston rod to the other.

2. A seat support according to claim 1 in which said cylinder and piston are positioned between the arms of the U-shaped spring element and oriented at an acute angle to both said arms.

3. A seat support according to claim 2 in which the pivotal connection to the upper arm is more remote from the base of the U-shaped spring element than is the pivotal connection to the lower arm.

4. A seat support according to claim 1 in which said cylinder has a partition therein between the piston and the other end of the cylinder, defining a fluid reservoir in the portion of the cylinder between said partition and the said other end, an orifice in said partition, and adjustable means for variably closing said orifice.

5. A seat support according to claim 4 in which said partition contains a passage having a check valve therein for permitting substantially unimpeded flow from said reservoir and substantially preventing flow in the reverse direction.

6. A seat support according to claim 5 in which the piston rod is sealed with respect to the end of the cylinder through which it extends, and the piston has leakage clearance with the cylinder and has a check valve and passage for permitting unimpeded flow through the piston toward the piston rod end thereof while preventing reverse flow, the diameter of said piston rod being substantial whereby the volume of fluid displaced past said piston in response to movement thereof is small as compared to the volume displaced to and from said reservoir.

CLINTON E. DEARDORFF.
WILLIAM E. ELDER.

REFERENCES CITED

The following references are of record in the file of this patent:

UNITED STATES PATENTS

| Number | Name | Date |
| --- | --- | --- |
| 1,171,297 | Adams | Feb. 8, 1916 |
| 2,159,067 | Weiser | May 23, 1939 |
| 2,284,352 | Zank | May 26, 1942 |
| 2,285,925 | Handy | June 9, 1942 |
| 2,432,554 | Knoedler | Dec. 16, 1947 |
| 2,452,280 | Zahller | Oct. 26, 1948 |